(12) United States Patent
Ellerthorpe et al.

(10) Patent No.: US 6,611,072 B1
(45) Date of Patent: Aug. 26, 2003

(54) SENSORLESS STALL DETECTION FOR MOTORS

(75) Inventors: Scott Ellerthorpe, San Francisco, CA (US); Christopher Botka, Santa Rosa, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/715,942

(22) Filed: Nov. 17, 2000

Related U.S. Application Data

(60) Provisional application No. 60/166,021, filed on Nov. 17, 1999.

(51) Int. Cl.[7] .................................................. H02H 7/08
(52) U.S. Cl. .................... 310/68 C; 361/23; 318/434
(58) Field of Search ................... 361/33, 23; 318/434; 310/68 C

(56) References Cited

U.S. PATENT DOCUMENTS

| | | | | |
|---|---|---|---|---|
| 4,376,295 A | * | 3/1983 | Uenosono et al. | 361/21 |
| 4,510,548 A | * | 4/1985 | Boothman | 361/25 |
| 4,682,263 A | * | 7/1987 | Gradnitzer et al. | 361/31 |
| 4,703,243 A | | 10/1987 | Ettelman et al. | 318/696 |
| 4,761,703 A | * | 8/1988 | Kliman et al. | 361/23 |
| 4,791,343 A | | 12/1988 | Ahrendt | 318/696 |
| 4,922,169 A | | 5/1990 | Freeman | 318/254 |
| 5,006,769 A | * | 4/1991 | Posedel | 318/434 |
| 5,017,846 A | * | 5/1991 | Young et al. | 318/244 |
| 5,329,214 A | | 7/1994 | Williamson et al. | 318/434 |
| 5,475,559 A | * | 12/1995 | Suzuki et al. | 361/76 |
| 5,600,527 A | * | 2/1997 | Engel et al. | 361/93 |

\* cited by examiner

*Primary Examiner*—Burton S. Mullins
(74) *Attorney, Agent, or Firm*—Renner, Otto, Boisselle & Sklar, LLP

(57) ABSTRACT

Motor stall can be detected without the use of additional sensors in a hybrid stepper motor through the detection of a harmonic component an associated motor spectrum. The associate motor spectrum can be a motor command voltage spectrum. For example, all of the harmonic components except for the second harmonic are eliminated from the voltage and the presence or lack thereof indicates whether or not the motor has stalled. The harmonic component can be isolated with the use of several cascaded filters. These filters can include notch filters and bandpass filters. Additionally, the circuit may be realized as either an analog, digital or hybrid circuit. The motor may be either hybrid stepper motor having 2, 3, or 5 phases, or a variable reluctance motor.

11 Claims, 10 Drawing Sheets

SENSORLESS STALL DETECTION FOR MOTORS

This application claims benefit of provisional application 60/166,021 filed Nov. 17, 1999.

TECHNICAL FIELD OF THE INVENTION

The invention herein described relates generally to sensorless detection of a stall condition of a motor and more particularly to the sensorless stall detection for an open-loop step motor system, although the present invention may have other applications.

BACKGROUND OF THE INVENTION

Motors, and particularly hybrid step motors, have been employed in several fields such as the disk drives for magnetic head positioning systems, drives for hydraulic or pneumatic valves, as well as numerous other applications. One of the primary advantages to using hybrid step motors in motion systems is that they are typically run in an open-loop fashion. However, excessive load torque can cause the rotor to lose synchronization with the commanded position. This is usually an unrecoverable error. In systems where it is critical to detect stall, an encoder is used as a feedback device only to ensure that the rotor is still turning. This encoder is an added system expense and lowers overall system reliability.

Therefore, a need exists in the motor art for a sensorless method of stall detection.

SUMMARY OF THE INVENTION

The present invention provides a system and method for sensorless detection of stall in an open loop motor. The system and method are characterized by the detection of at least one stall indicating harmonic in the spectrum of the commanded phase voltage of a motor. Accordingly, stall detection can be accomplished in an open-loop system without the need for an encoder.

According to one aspect of the present invention, a motor system comprises a motor and a detector which monitors at least one stall indicating harmonic associated with a motor spectrum.

In an embodiment, the stall indicating harmonic includes an even harmonic of the commanded phase voltage (or current) and, more particularly, the second harmonic of the commanded phase voltage.

In an embodiment, a filter is provided to extract the stall indicating harmonic component from the commanded phase voltage and a comparator compares the extracted harmonic (or harmonics) to a threshold value. If the threshold value is exceeded, a stall condition is indicated. Other functional criteria may be utilized as desired.

The motor can be a hybrid stepper having 2, 3, or 5 phases or a variable reluctance motor. The detector may be a digital detector, an analog detector or a hybrid detector.

According to another aspect of the present invention, a method of detecting a stall condition of a motor comprises monitoring at least one stall indicating harmonic associated with a motor spectrum and determining whether the motor has stalled as a function of the at least one stall indicating harmonic.

In one embodiment, the at least one stall indicating harmonic includes even harmonics of the commanded phase voltage and, more particularly the second harmonic.

The method may be applied, for example, to a hybrid step motor or variable reluctance motor. The hybrid step motor may have 2, 3, or 5 phases.

In an embodiment, the motor may be controlled in accordance with whether a stall condition has been determined. The motor may be driven by a driving voltage including a fundamental harmonic component. The driving voltage may include an odd harmonic greater than the fundamental harmonic. The monitoring or determining may include at least one digital processing step, at least one analog processing step or at least one hybrid processing step.

The foregoing and other features of the invention are herein fully described and particularly pointed out in the claims, the following description and the annexed drawings setting forth in detail certain illustrative embodiments of the invention. These embodiments, are indicative, however, are but a few of the various ways in which the principles of the invention may be employed. Other objects, advantages and novel features of the invention will become apparent from the following detailed description of the invention when considered in conjunction with the drawings.

THE DETAILED DESCRIPTION

Figure 1:
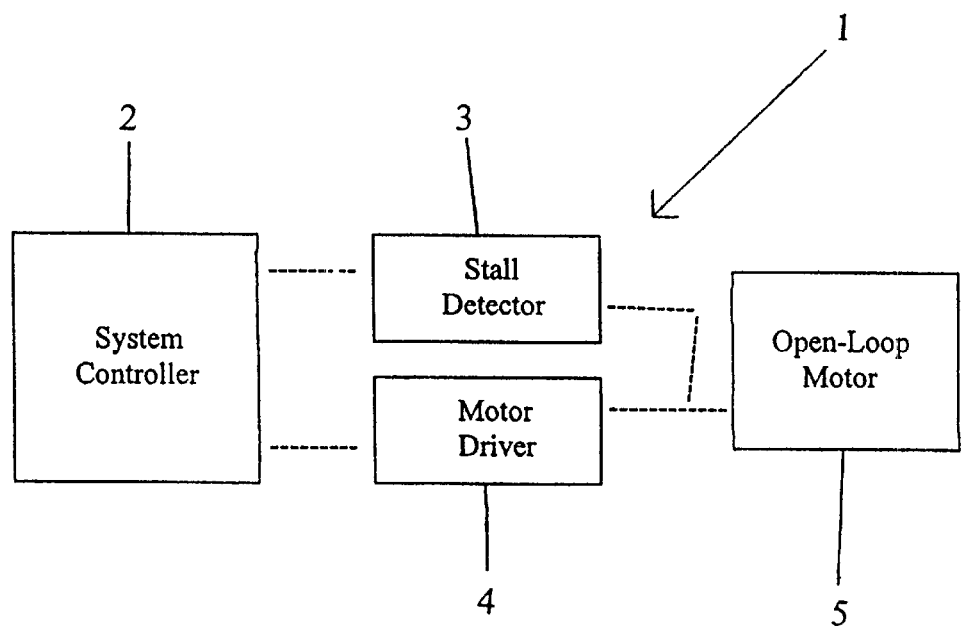
FIG. 1 is a block diagram of an embodiment of the present invention.

Referring now in detail to the drawings, FIG. 1 shows a block diagram of a motor system 1 according to the present invention, which is preferably operated in open-loop fashion. The motor system 1 comprises a system controller 2, a stall detector 3, a motor driver 4 and a motor 5. The controller, motor driver and motor may be of conventional design whereas our embodiment of a stall detector is described below. The motor may be a hybrid step motor, variable reluctance motor, or other type to which the principles of the invention may be applied.

The system controller 2 causes a command voltage to be produced by the motor driver 4. The command voltage causes the open-loop motor 5 to rotate to a commanded position. When the motor stalls 5, the motor does not move to the commanded position, that is, the motor stalls.

The inventors have discovered that at least one stall indicating harmonic appears in the commanded phase voltage spectrum. In accordance with the invention, the stall detector 3 continually monitors the command voltage of the motor driver 4 for the presence of the stall indicating harmonic or harmonics and indicates a stall condition to the system controller 2 as a function of the stall indicating harmonic. The system controller 2 can then perform appropriate error handling tasks or take some other action. More particularly the inventors have discovered that at least one even harmonic of the commanded phase voltage spectrum is created when the rotor of the motor is stalled. More particularly, a second harmonic component is created. This second harmonic component can be compared to a threshold value to provide an indication of a motor stall condition.

Figure 2:
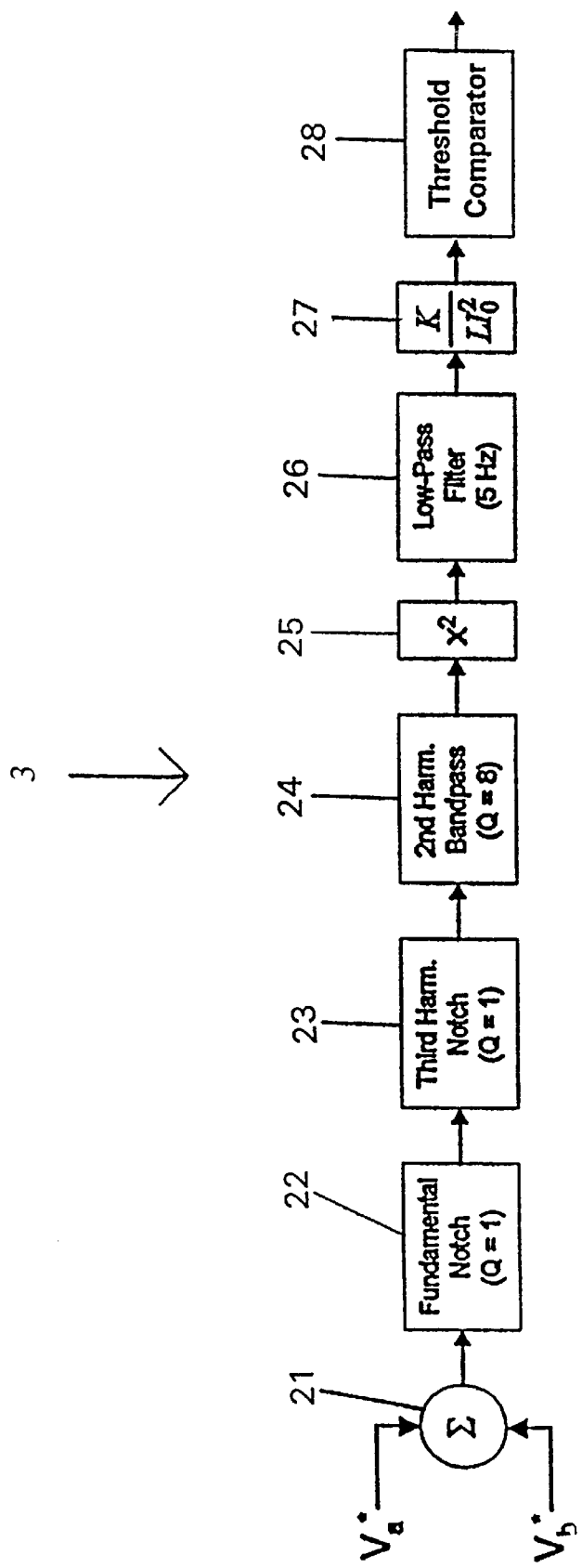
FIG. 2 is a diagrammatic illustration of a sensorless stall detector according to the invention.

The stall detector 3 is diagrammatically illustrated in FIG. 2, where it is configured as a second order harmonic detector for the motor 5. The detector 3 includes a summer 21 that sums the phase voltage commands $V_a^*$ and $V_b^*$. The summation of the phase command voltages helps to minimize any affect that saliency (i.e. the positional variation of inductance) may have on the resulting voltage spectrum. However, the summer 21 can be eliminated from detector 3 and one or both phase command voltages may be used individually monitored.

The voltage sum is passed through a fundamental notch filter 22 which eliminates the fundamental harmonic. The output of the fundamental notch filter is supplied to a third harmonic notch filter 23 which eliminates the third harmonic. The output of the third harmonic notch filter 23 is supplied to a second harmonic bandpass filter 24 which passes the second harmonic and attenuates all other frequency components. The amount of attenuation increases as the frequency goes further away from the second harmonic. At this point, the output of the second harmonic bandpass filter 24 only contains the second harmonic.

Squarer 25 squares the second harmonic to get a value proportional to the power of the second harmonic. The output of squarer 25 is then input into a low pass filter 26 to increase the disturbance rejection. The output of low pass filter 26 is then amplified by amplifier 27. The output of amplifier 27 is compared to a threshold value by comparator 28 to determine whether or not the second order harmonic is present. A stalled condition is indicated when the second harmonic is present.

As above indicates, a stall detector according to the invention may be used with hybrid step motors as well as other types of motors. Hybrid motors are available in different forms. Typical styles are two-, three- and five-phase motors. The following detailed discussion focuses on a two-phase motor (as was done above with the exemplary detector 3 shown in FIG. 2); however, those skilled in the art will readily appreciate that expressions for other motor styles can be inferred from those given below.

Figure 3:
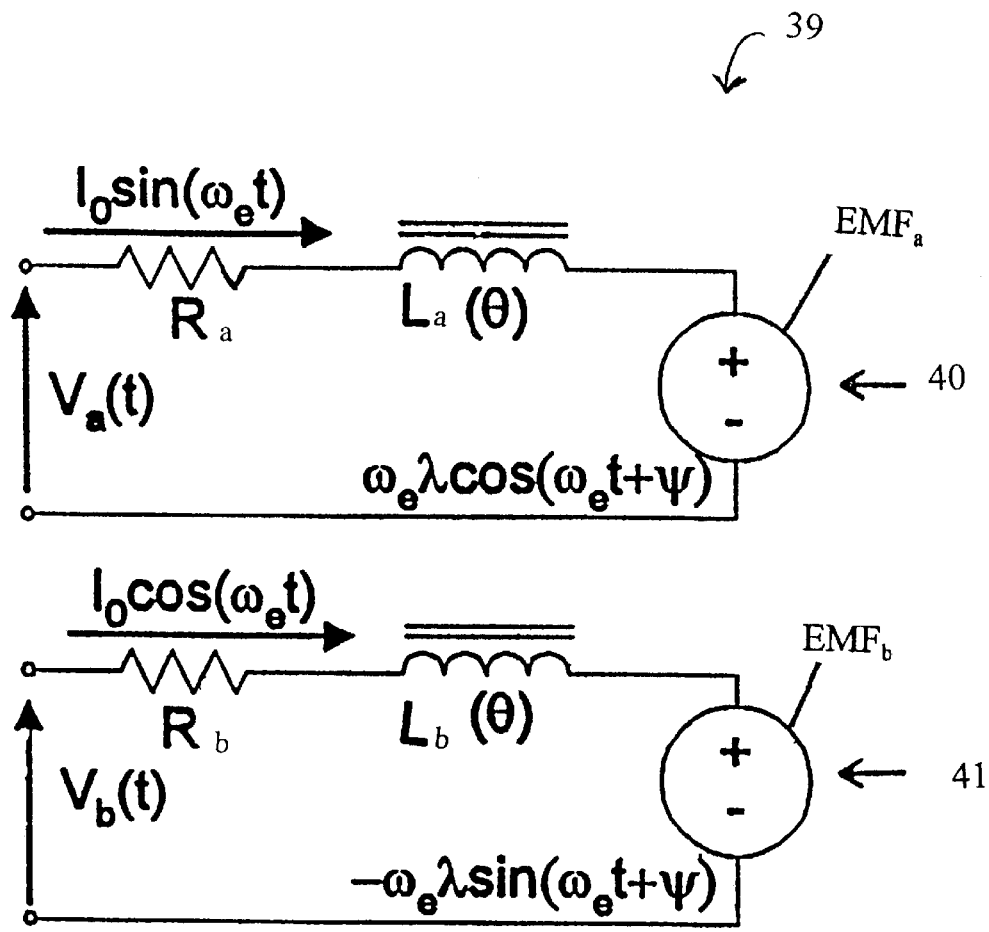
FIG. 3 is an equivalent circuit representation of a two-phase step winding motor.

FIG. 3 shows a schematic model of the windings of a two-phase step motor 39. The first phase winding 40 and the second phase winding 41 each have similar components. Specifically, equivalent winding circuits 40 and 41 respectively include back electromotive forces $EMF_a$ and $EMF_b$, inductive components $L_a(\theta)$ and $L_b(\theta)$ and resistive components $R_a$ and $R_b$. The power in each back electromotive force $EMF_a$ and $EMF_b$ is substantially the same as the mechanical power produced in the motor. Thus, the back EMF voltage sources have voltages which are proportional to the flux linkage $\lambda$ and the speed $\omega_e$. The voltage of the first phase winding 40 varies according to $\cos(\omega_e t+\psi)$ while the voltage of the second phase winding 41 varies according to $-\sin(\omega_e t+\psi)$.

While the resistances $R_a$ and $R_b$ are an identical constant value for both windings, the inductance of each of the phases varies with position. The current through the first phase winding 40 is $I_0 \sin(\omega_e t)$ and the current through the second phase winding 41 is $I_0 \cos(\omega_e t)$.

The electrical circuit, excluding magnetic losses, is as follows:

$$\bar{v} = \begin{bmatrix} R_{cu} & 0 \\ 0 & R_{cu} \end{bmatrix} \bar{i} + \bar{L}\frac{d}{dt}\bar{i} + \omega_e \lambda \begin{bmatrix} \cos(\omega_e t + \psi) \\ -\sin(\omega_e t + \psi) \end{bmatrix} \quad (1)$$

where $$\bar{L} = \begin{bmatrix} L_0 + L_1\cos(2\theta_e + \psi) & M_{ab} \\ M_{ba} & L_0 - L_1\cos(2\theta_e + \psi) \end{bmatrix} \quad (2)$$

While the motor is moving, the resistive losses can be neglected since $$\begin{bmatrix} R_{cu} & 0 \\ 0 & R_{cu} \end{bmatrix} \bar{i} \ll \bar{L}\frac{d}{dt}\bar{i} + \omega_e \lambda \begin{bmatrix} \cos(\omega_e t + \psi) \\ -\sin(\omega_e t + \psi) \end{bmatrix} \quad (3)$$

Thus, the equation reduces to the following:

$$\bar{v} = \bar{L}\frac{d}{dt}\bar{i} + \omega_e \lambda \begin{bmatrix} \cos(\omega_e t + \psi) \\ -\sin(\omega_e t + \psi) \end{bmatrix} \quad (4)$$

By multiplying both sides of equation 4 by the current we get the total motor power produced:

$$\omega_e \lambda I_0 [\cos(\omega_e t+\psi)\sin(\omega_e t)-\sin(\omega_e t+\psi)\cos(\omega_e t)]=-\omega_e \lambda I_0 \sin(\psi) \quad (5)$$

Since the motor power is equal to the electromagnetic torque $T_e$ multiplied by velocity $\omega_e$, we can solve for the torque which is:

$$T_e = -\lambda I_0 \sin(\psi) \quad (6)$$

Equation 6 indicates that the electromagnetic torque produced by the motor is a direct function of the displacement angle $\psi$. Furthermore, since a positive displacement results in a negative torque, the torque is a restoring torque.

Figure 4:
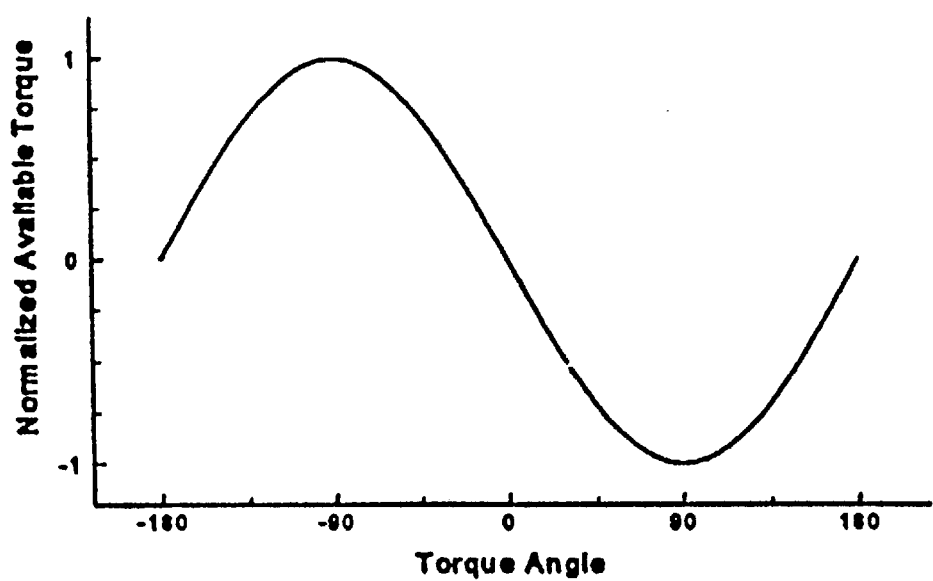
FIG. 4 is a graph of motor torque output verses displacement.

A step motor operates as long as the load torque is below the peak available is motor torque such as in FIG. 4, which is simply a plot of equation 6. When that peak is exceeded, the motor no longer is able to operate and stalls. That is the motor operates normally when $\psi$ does not exceed a maximum value, typically 90°, or a minimum value, typically −90°. However, when $\psi$ exceeds these values, the motor is no longer able to function and a stall will occur. Optimal performance (maximum available torque) occurs when the displacement angle $\psi$ is as close to maximum or minimum value of displacement as possible, but without exceeding them. Thus, the optimal performance condition and an unrecoverable stall condition are extremely close to each other.

In an open-loop motor system, a stall is unrecoverable because of a lack of feedback in the system. Since there is no feedback, the motor controller will not know of the stall and will continue to actuate the motor. The continued actuation can result in undesirable conditions and damage to the motor or load.

Figure 5:
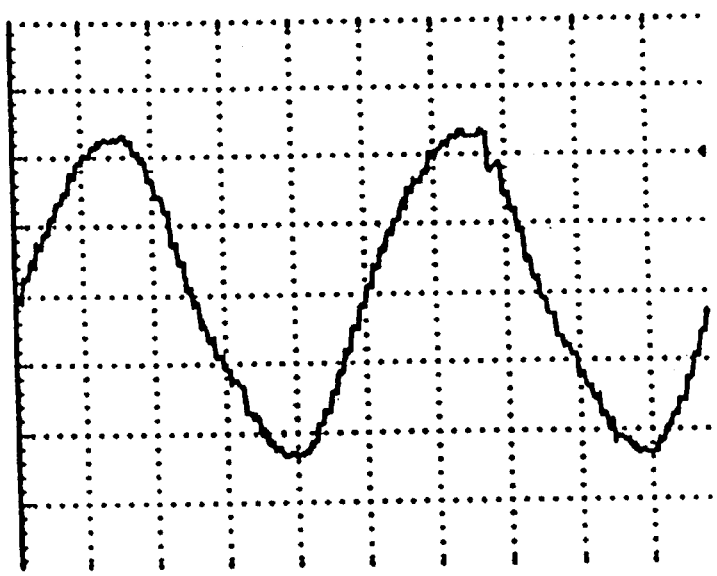
FIG. 5 shows a voltage waveform in a phase winding operating in an unsaturated mode.
Figure 6:
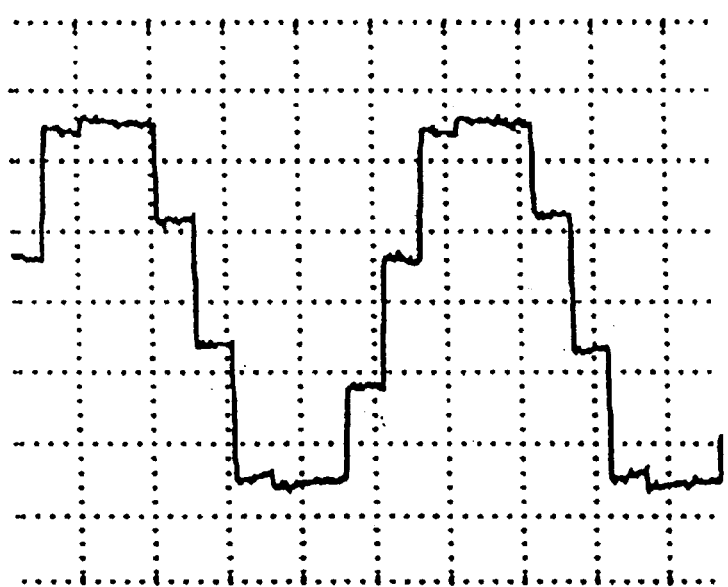
FIG. 6 shows a voltage waveform in a phase winding operating in a saturated mode.

Operation of the motor results in two kinds of voltage modes in the phase windings. FIG. 5 shows a voltage waveform in an unsaturated mode and FIG. 6 shows a voltage waveform in a saturated mode. The unsaturated mode occurs when there is sufficient bus voltage available to achieve the desired current. The saturated mode occurs when there is insufficient voltage to generate the desired current in the windings. When the motor is functioning properly, the unsaturated mode occurs at lower velocities while the saturated mode occurs at higher velocities.

When operating in the saturation mode, the motor includes energy at the odd harmonics. The amplitude of first harmonic is usually larger than all of the other harmonics. Typically, the only other harmonics of consequence are the third, fifth, and seventh harmonics as the ninth and higher order odd harmonics are usually negligible. The amplitudes of the even harmonics are negligible, as seen in FIG. 7, which shows a voltage spectrum of a motor operating in the saturation mode.

Figure 7:
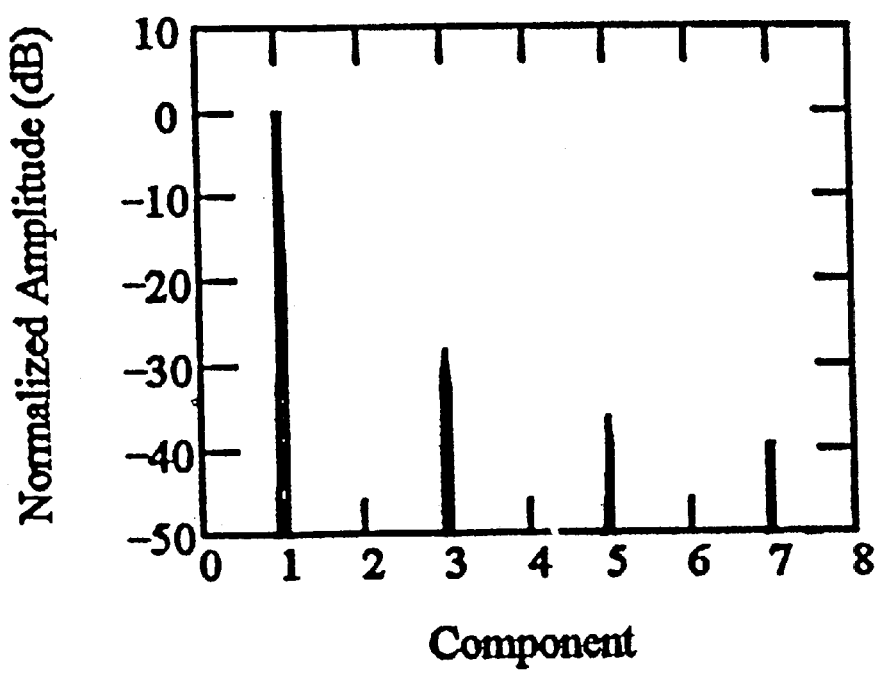
FIG. 7 shows the voltage spectrum of a motor operating in the saturated mode.
Figure 8:
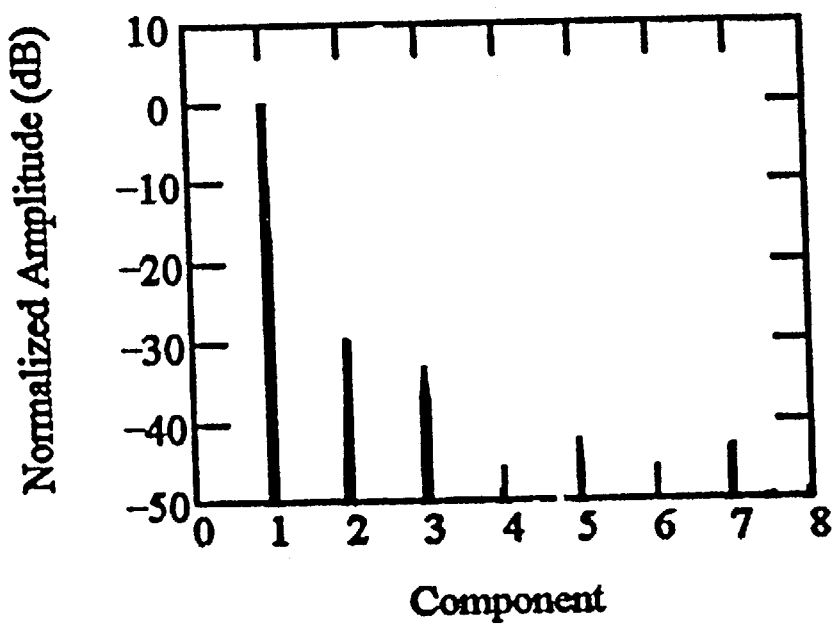
FIG. 8 shows the voltage spectrum of a stalled motor.

FIG. 8 shows how the voltage spectrum of FIG. 7 changes when this motor stalls. Specifically, the odd harmonics become slightly more attenuated (e.g., 5–10 dB) as compared to the fundamental harmonic. But more importantly, a large second harmonic amplitude results due to the stalling of the motor.

A motor operating in the unsaturated mode acts substantially the same as a motor operating in the saturated mode. However, there is a difference. The second harmonic appears for a few milliseconds after the stall condition occurs and then disappears. Thus, the second harmonic stall response of a motor in the saturated mode is transient while the second harmonic stall response of a motor in the unsaturated mode is persistent.

A motor operating in the slightly or partially saturated mode acts substantially the same as a motor operating in the saturated mode when not in a stall condition. But the motor acts substantially the same as a motor operating in the unsaturated mode when in a stall condition.

In view of the foregoing, a method of detecting the stall condition is through the detection of a stall indicating harmonic. (A stall indicating harmonic is a harmonic frequency that appears at least at the beginning of a stall condition in a spectrum associated with a motor. The amount of energy in the stall indicating harmonic which is indicating a stall condition increases as compared with the amount of energy in the stall indicating harmonic when a stall condition is not indicated.) The detection of the stall indicating harmonic may be accomplished through the filtering of the command voltage of the motor driver 4 (FIG. 1). The filtering may be accomplished by a plurality of filters such a fundamental notch filter 22, third harmonic filter 23 and a bandpass filter 24 (FIG. 2).

The fundamental and third harmonic notch filters 22 and 23 are greatly attenuated at their respective notch frequencies $\omega_c$. Attenuation is minimal at frequencies away from the notch frequencies. Specifically, the gain G(s) of a notch filter having a notch or critical frequency of $\omega_c$ is as follows:

$$G(s) = \frac{s_c^2 + \omega_c^2}{s^2 + \frac{\omega_c}{Q}s + \omega_c^2} \quad (6)$$

Figure 9:
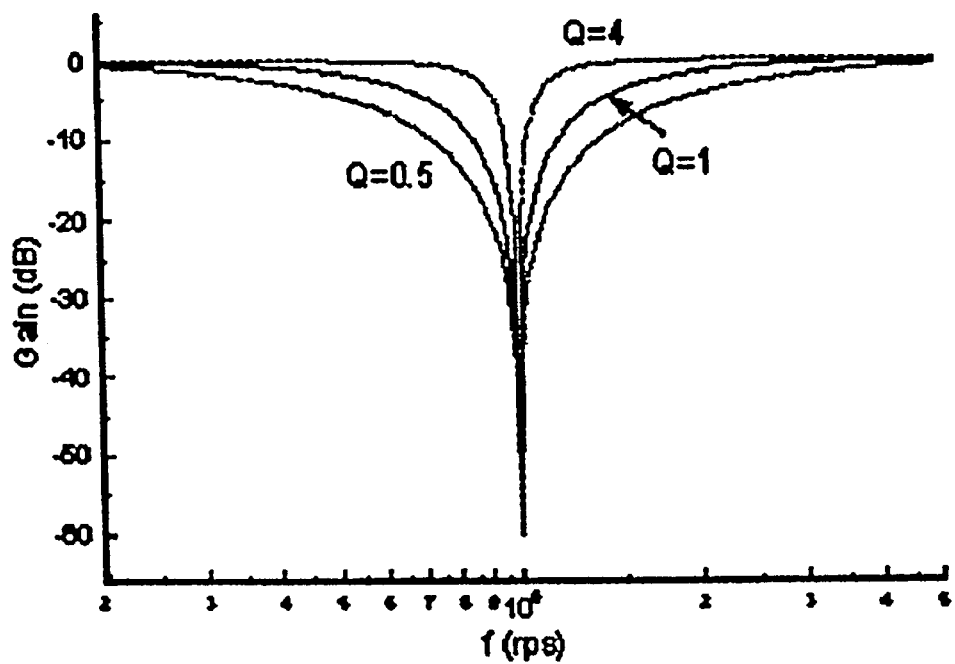
FIG. 9 shows the frequency response of a notch filter for different quality factors.

FIG. 9 shows the gain of a notch filter versus frequency for different quality factors. A higher quality factor Q results in a smaller notch width. Since the frequencies adjacent the notch frequency $\omega_c$ are to be filtered out by the second order harmonic bandpass filter 24, a lower quality factor notch filter may be used.

The bandpass filter 24 has minimum attenuation at the center or critical frequency $\omega_c$ of the bandpass filter 24. Because the bandpass filter 24 attenuates all non-second harmonic frequencies, a higher quality factor Q is preferred for this filter. The gain of the bandpass filter G(s) having a $\omega_c$ is as follows:

$$G(s) = \frac{\frac{\omega_c}{Q}s}{s^2 + \frac{\omega_c}{Q}s + \omega_c^2} \quad (7)$$

Figure 10:
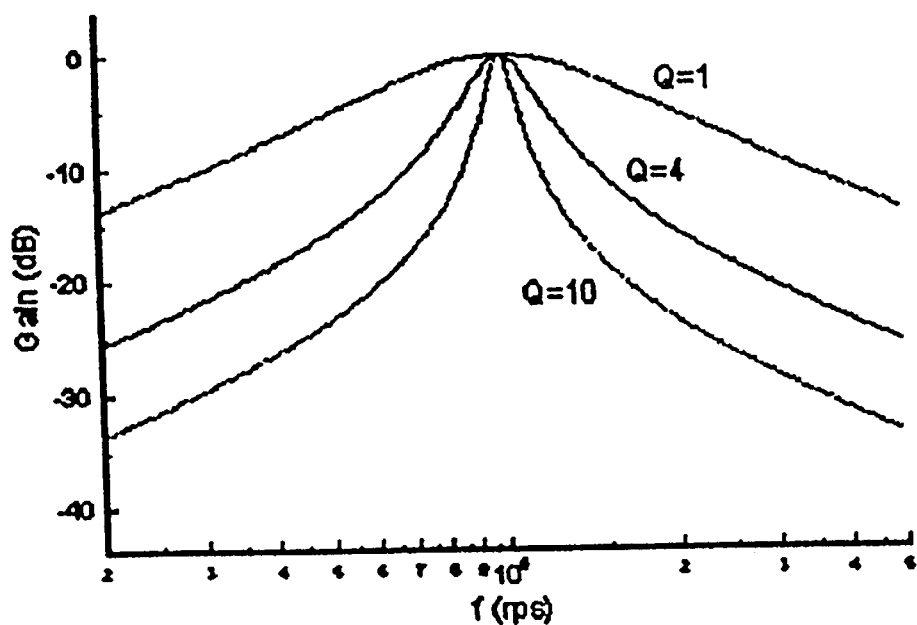
FIG. 10 shows the frequency response of a bandpass filter for different quality factors.

FIG. 10 shows the gain for a bandpass filter having three different quality factors.

Alternatively, the analog filters above could have been digital filters. One common technique for converting from an analog to a digital system is to use the following Bilinear Transform:

$$s = \frac{2}{T}\frac{1-z^{-1}}{1+z^{-1}} \quad (8)$$

The critical frequencies of analog systems are related to the critical frequencies of the digital system by $d_c = \omega_c T$. Thus, digital notch filter gain is as follows:

$$G(z) = \frac{N_0 z^2 + D_1 z + N_0}{z^2 + D_1 z + D_0} \quad (9)$$

Similarly, the digital bandpass filter gain is as follows:

$$G(z) = \frac{N_1(z^2 - 1)}{z^2 + D_1 z + D_0} \quad (10)$$

The coefficients $N_0$, $N_1$, $D_0$ and $D_1$ are defined as follows:

$$N_0 = \frac{Q(d_c^2 + 1)}{Q(d_c^2 + 1) + d_c} \quad (11)$$

$$N_1 = \frac{d_c}{Qd_c^2 + 1 + d_c} \quad (12)$$

$$D_0 = \frac{Q(d_c^2 + 1) - d_c}{Q(d_c^2 + 1) + d_c} \quad (13)$$

$$D_1 = \frac{2Q(d_c^2 - 1)}{Q(d_c^2 + 1) + d_c} \quad (14)$$

Alternatively, other digital transformations may be used. For example, the digital critical frequency can be redefined according to the non-linear equation 15 so as to avoid the frequency error associated with the Bilinear Transform. Specifically, the new digital critical frequency $d_c'$ is related to the digital critical frequency $d_c$ as follows:

$$d_c^1 = d_c + \frac{1}{3}d_c^3 \quad (15)$$

When the motor is operating at slower speeds under 2 rps the second harmonic can sometimes be present under normal operating conditions. Also, in digital systems, each spectral line may exist in an aliased form from the switching frequency. When the aliased $7^{th}$ harmonic is less than the $3^{rd}$ harmonic, a second harmonic may be erroneously detected. This occurs when the fundamental frequency x and the sampling rate $f_s$ satisfy $3x=f_s-7x$. Thus, for a 20 kHz system, the maximum velocity which stall detection can be effected is 40 rps. However, the maximum velocity can be increased by increasing the sampling rate.

It also is noted that a digital filter may erroneously detect a stall when transitioning to a valid speed such as occurs during start up. This can be avoided by delaying detection of a stall condition for a period of time after start up.

As previously noted, the above description was given in relation to a 2-phase hybrid step motor. However, other hybrid step motors can be used. For example, 3- or 5-phased motors could be used. Additionally, the present invention is applicable to non-step motors such as a variable reluctance motor.

Several filters to isolate the second harmonic have been disclosed. However, any filtering arrangement which isolates the second harmonic (or the harmonic of interest) can be used. In fact, any means which detects the presence of a second harmonic (or other stall indicating harmonic) should be acceptable.

The voltages for the present invention typically are pure sine waves. However, they could also be comprised of a fundamental sine wave and a third harmonic sine wave, or any other acceptable driving voltage. Alternatively, a current could be used instead of a voltage. These alternative driving methods may result in the harmonic that indicates a stalled motor occurring at other than the second harmonic.

Although the invention has been shown and described with respect to a certain preferred embodiment or embodiments, it is obvious that equivalent alternatives and modifications will occur to others skilled in the art upon the reading and understanding of this specification and the annexed drawings. In particular regard to the various functions performed by the above described elements (components, assemblies, devices, etc.), the terms used to describe such elements are intended to correspond, unless otherwise indicated, to any element which performs the specified function of the described elements (i.e., that is functionally equivalent), even though not structurally equivalent to the disclosed structure which performs the function in the herein illustrated exemplary embodiment or embodiments of the invention. In addition, while a particular feature of the invention may have been described above with respect to one or more of the illustrated embodiments, such features may be combined with one or more other features in the other embodiments, as may be desired and advantageous for any given or particular application.

That which is claimed follows:

1. A motor system comprising:

a motor; and a detector which monitors at least one stall indicating harmonic associated with a motor spectrum, and wherein at least two phase-winding voltages are summed by a summing unit.

2. The system according to claim 1, wherein the at least one stall indicating harmonic includes an even harmonic.

3. The system according claim 1, wherein the at least one stall indicating harmonic includes a second harmonic.

4. The system of claim 3, wherein a stall condition is indicated when the amplitude of the second harmonic exceeds a predetermined level.

5. The system according to claim 1, wherein the detector includes at least one filter.

6. The system according to claim 5, wherein the at least one filter includes at least one notch filter or bandpass filter.

7. The system according to claim 1, wherein the motor is a hybrid step motor having 2, 3, or 5 phases.

8. The system according to claim 1, wherein the motor is a variable reluctance motor.

9. The system according to claim 1, wherein the detector is a digital detector.

10. The system according to claim 1, wherein the detector is an analog detector.

11. The system according to claim 1, wherein the detector is a hybrid detector.

* * * * *